United States Patent
Aleong et al.

(10) Patent No.: US 9,406,034 B2
(45) Date of Patent: Aug. 2, 2016

(54) MERGER INTEGRATION TOOLKIT SYSTEM AND METHOD FOR MILESTONE TRACKING

(75) Inventors: Richard W. Aleong, Philadelphia, PA (US); P. Christopher Bosco, Overland Park, KS (US); Arthur Bert, South Natick, MA (US); Dorree F. Ebner, Haddon Heights, NJ (US); Kristin L. Ficery, Atlanta, GA (US); Bruce P. Kiene, Mesa, AZ (US); Connor G. McGogney, New York, NY (US); Jill S. Dailey, Chatham, NJ (US); Ali Lila, Toronto (CA)

(73) Assignee: Accenture Global Services Limited, Dublin (IE)

( * ) Notice: Subject to any disclaimer, the term of this patent is extended or adjusted under 35 U.S.C. 154(b) by 2023 days.

(21) Appl. No.: 11/692,003

(22) Filed: Mar. 27, 2007

(65) Prior Publication Data

US 2008/0040140 A1 Feb. 14, 2008

Related U.S. Application Data

(60) Provisional application No. 60/786,324, filed on Mar. 27, 2006.

(51) Int. Cl.
*G06Q 10/10* (2012.01)
*G06Q 10/06* (2012.01)
*G06Q 30/02* (2012.01)

(52) U.S. Cl.
CPC .......... *G06Q 10/06* (2013.01); *G06Q 10/06393* (2013.01); *G06Q 10/103* (2013.01)

(58) Field of Classification Search
CPC .................................................. G06Q 10/103
USPC .................................................. 705/1.1–912
See application file for complete search history.

(56) References Cited

U.S. PATENT DOCUMENTS 5,167,011 A 11/1992 Priest
5,233,513 A 8/1993 Doyle (Continued)

OTHER PUBLICATIONS

General Services Administration Federal Supply Service, Feb. 17, 2004, pp. 1-25.

(Continued)

*Primary Examiner* — Jonathan Ouellette
(74) *Attorney, Agent, or Firm* — Harrity & Harrity, LLP

(57) ABSTRACT

The present invention provides for a method and a computer system for providing functionality for electronically managing and supporting a merger integration of businesses, using software and other computer-implemented tools. In one aspect of the invention, the method and system provide program milestone tracking for an integration of businesses, where the businesses are subject to a merger or acquisition. The system provides a collaboration environment computer program for assisting a group of individuals performing the integration of businesses. The collaboration environment computer program provides administrative controls and communication among the group of individuals. A project management computer program assists the group of individuals and is configured to manage project schedules, budgets, and timeframes. A program milestone component is established and configured to facilitate creating and tracking program milestones for the collaboration environment computer program. The program milestone component also configured to interface the collaboration environment computer program and the project management computer program such that the collaboration environment computer program directly links to the project management computer program and receive program milestone updates.

19 Claims, 14 Drawing Sheets

(56) References Cited

U.S. PATENT DOCUMENTS

| | | | |
|---|---|---|---|
| 5,303,170 | A | 4/1994 | Valko |
| 5,581,691 | A | 12/1996 | Hsu et al. |
| 5,765,140 | A | 6/1998 | Knudson et al. |
| 5,826,252 | A | 10/1998 | Wolters et al. |
| 5,835,758 | A * | 11/1998 | Nochur et al. |
| 5,875,431 | A | 2/1999 | Heckman et al. |
| 6,571,235 | B1 * | 5/2003 | Marpe et al. |
| 6,581,039 | B2 * | 6/2003 | Marpe et al. ............... 705/7.29 |
| 6,671,692 | B1 * | 12/2003 | Marpe et al. |
| 6,671,693 | B1 * | 12/2003 | Marpe et al. |
| 7,006,978 | B2 | 2/2006 | Lineberry et al. |
| 7,051,036 | B2 * | 5/2006 | Rosnow et al. ............... 707/723 |
| 7,162,427 | B1 | 1/2007 | Myrick et al. |
| 7,734,927 | B2 * | 6/2010 | Stewart et al. ............... 713/182 |
| 8,606,588 | B1 * | 12/2013 | Marpe et al. ............... 705/1.1 |
| 2002/0046187 | A1 | 4/2002 | Vargas et al. |
| 2002/0091991 | A1 | 7/2002 | Castro |
| 2002/0169649 | A1 | 11/2002 | Lineberry et al. |
| 2003/0061225 | A1 | 3/2003 | Bowman et al. |
| 2004/0215551 | A1 | 10/2004 | Eder |
| 2004/0249658 | A1 | 12/2004 | Schwerin-Wenzel et al. |
| 2005/0114829 | A1 * | 5/2005 | Robin et al. ............... 717/101 |
| 2005/0234767 | A1 | 10/2005 | Bolzman et al. |
| 2006/0282380 | A1 * | 12/2006 | Birney et al. ............... 705/42 |
| 2009/0313598 | A1 | 12/2009 | Donaldson |

OTHER PUBLICATIONS

IT Governance, SQS Software Quality Solutions, www.sqs.com, May 2004, 4 pages.

Optimize IT Governance, 2005, 4 pages.

Intralinks, Solutions, www.intralinks.com, 2000, 1 page.

Linkify, Approach, www.linkify.com, 2000, 2 pages.

Linkify, Approach 2, www.linkify.com, 2000, 2 pages.

Linkify, Approach 3, www.linkify.com, 2000, 3 pages.

Linkify, Applications, www.linkify.com, 2000, 1 page.

Maximize the Value of Acquisitions with Valchemy M&A, www.valchemy.com, May 3, 2005.

Investor's Business Daily, Software Designed to Ease Companies Through M&A's, Dec. 31, 2004.

Microsoft Office Project, http://www.microsoft.com, Collaboration and Communication, 2003, 2 pages.

Microsoft Office Project, http://www.microsoft.com, Portfolio Management, 2003, 2 pages.

Microsoft Office Project, http://www.microsoft.com, Project Management, 2003, 2 pages.

Microsoft Office Project, http://www.microsoft.com, Resource Management, 2003, 2 pages.

Microsoft Office Project, http://www.microsoft.com, Microsoft, Office Enterprise Project Management Solution, 2003, 2 pages.

Microsoft Office SharePoint Portal Server 2003, Customer Evaluation Guide, Sep. 2003, pp. 1-85.

Eric M. Gauthier, "Post-merger and acquisition integration in an enterprise solutions environment," Nov. 2001.

Jan. 1, 1980-Jan. 1, 2005, Google Search Results relating to "tactical objectives after a merger".

Nov. 1, 2013 Final Office Action in U.S. Appl. No. 11/691.987.

Feb. 26, 2013 Final Office Action in U.S. Appl. No. 11/606,433.

May 23, 2613 Final Office Action in U.S. Appl. No. 11/692,029.

* cited by examiner

| General | |
|---|---|
| Analysis Request ID: | 2 |
| Requestor Name: | MIToolkit Administrator |
| Event: | Integration Event |
| Area: | Corporate Centers |
| Team: | HR and Culture |
| Project: | General |
| Status: | Open |
| Analysis Title: | Example workflow item |
| Prioritization: | High |
| PMO Confirmation of Prioritization: | High |
| Purpose Of Analysis: | To demonstrate workflow functionality |
| Decisions/Projects Impacted: | |
| Detailed Description of Analysis Tasks: | None |
| Deliverable Template/Format: | None |
| Potential Cross Functional Dependencies: | |
| Open Issues: | |
| Open Risks: | |
| Estimated Duration to Complete Analysis: | 1 hour |
| Additional Staffing Considerations: | None required. |
| Analysis Due Date: | 2/21/2007 |
| Are Employees Needed to Complete this Analysis: | No |
| Day 0: | False |
| Day 1: | False |
| Day 100: | False |

*User, Clean Room and Access Rights Assignment*

User: MITOOLKIT\demouser1  ← Configured per user

| Analysis Request List | No Access | Read Only | Read and Write |
|---|---|---|---|
| Attachments | ○ | ○ | ● |
| Requestor Name | ○ | ○ | ● |
| Status | ○ | ○ | ● |
| Analysis Title | ○ | ○ | ● |
| Prioritization | ○ | ○ | ● |
| PMO Confirmation of Prioritization | ○ | ○ | ● |
| Purpose Of Analysis | ○ | ○ | ● |
| Decisions/Projects Impacted | ○ | ○ | ● |

Configure level of access to each field in Clean Room

Figure 23

MERGER INTEGRATION TOOLKIT SYSTEM AND METHOD FOR MILESTONE TRACKING

CROSS REFERENCE TO RELATED APPLICATIONS

This application claims the benefit of U.S. Provisional Application No. 60/786,324, filed Mar. 27, 2006, entitled "Merger Integration Toolkit," the contents of which are incorporated herein in their entirety.

BACKGROUND OF THE INVENTION

In our modern market economies, many companies have tried to maintain or enhance growth and profitability by focusing upon finding synergies that can be obtained by acquiring or merging with or by alliances with other companies. These synergies, for example, could result from revenue enhancement, cost reduction provided by eliminating duplication of resources, economies of scale or vertical and horizontal integration. Business mergers are therefore becoming increasingly more frequent occurrences in many markets and industries. Such mergers are becoming more and more complex with the involved companies being large and diverse, and often much of their fiscal health and growth upon the success of the merger. Success of the merger is thus of paramount importance.

Many businesses turn to external consulting firms or other specialists to evaluate proposed mergers, to assist in planning activities in an upcoming scheduled merger, and to manage the transition period for an ongoing merger. Much must happen in a relatively short time period for a merger to proceed successfully, including the merging of organizations, cultures, and technologies, and the elimination of redundant resources. The best elements from each of the original companies must be maintained, even as new elements needed by the resulting merged company are established. An experienced consulting firm or other organization of specialists advantageously brings to bear its pooled expertise and best practice knowledge with regard to these merger-related (or acquisition-related) changes. While one or more of the managers of the merging companies may have experience regarding a few prior mergers, the more experienced specialists may have the benefit of working on more total mergers than the combined experiences of all the managers of the merging companies. Thus, specialist firms are able to capitalize upon their wider scope of past experience and specific knowledge regarding the lifecycle of mergers, utilizing knowledge of commonly encountered problems and pitfalls, guideposts for tracking progress, and ways to solve problems and avoid pitfalls to more efficiently direct the merging companies to meet the ultimate business objectives underlying the merger.

While specialists can be hired at the pre-merger stage (i.e., during negotiations or prior to a deal being announced publicly), oftentimes, specialists are hired into a post-merger situation to manage a merger after the companies have already signed contracts and announced the merger, and sometimes even after various post-merger integration steps have been taken. When a particular specialist or specialist organization is brought into a merger situation after the pre-merger stage, they must be able to get a quick, yet accurate snapshot assessment regarding where the merging company stands in the various tasks that should be completed by the merger integration process. Only after getting an accurate snapshot can the specialists utilize their personal experiences and expertise to advise the client companies how to improve their post-merger integration efforts. Thus, in order to make the business relationship between the specialist and the merging companies successful, the specialist organizations must have the capability to assess and guide the progress of the merger efficiently and accurately at various times within the merger lifecycle.

The management of post-merger integration can be heavily dependent upon the personal knowledge of the involved specialists. While a particular "lead" specialist within a specialist organization may be very knowledgeable regarding particular areas of post-merger integration, that particular specialist will likely not be able to perform a complete and accurate assessment in a quick manner on their own. These lead specialists typically enlist additional personnel resources from their organization, usually in the form of a team of less experienced specialists that will work under the direction of the lead specialist. These team members are often given the tasks of information gathering and sorting, such as by contacting and interviewing employees of the merging companies and obtaining, reviewing and organizing records relevant to post-merger integration activities. These can be complicated as progress assessments are often necessary at various times during a merger integration. Notably, merger integrations generally evolve according to a life cycle of different phases, characterized by different goals, tasks and activities. Thus, certain types of information may only be relevant to (or more relevant to) making progress assessments during one phase of a post-merger integration while less relevant or irrelevant to making progress assessments undertaken at other stages or phases of the integration. The team members therefore need direction regarding what information to seek at a particular time and from what sources to seek that information.

Since a specialist organization's worth to merging companies lies in the collective experiences, knowledge capital of its various individual specialists, and the technological tools it has developed to support mergers, it is important for those organizations to leverage this past experience and knowledge effectively by disseminating it to other specialists within the same organization. Only then can this knowledge and experience be utilized fully in the progress assessments of various mergers by many specialists within the organization in a manner that enables teams to perform the planning and analysis as quick, economical, consistent, and accurate as is possible. Thus, in order to make the business relationship between the specialist and the merging companies successful, there also is a need for the specialist organization to have mechanisms for effectively sharing the knowledge and experience of lead specialists with their team members and for employing technological assets that have been developed to efficiently implement such knowledge and experience. Such sharing allows the specialist organization to be certain to obtain the most relevant information needed to identify those important post-merger activities and tasks to be addressed.

Examples of such technological tools and assets may include computer applications that can increase the efficiency of business processes and improve team productivity for organizations and business units. Such computer applications provide tools for collaboration and connectivity across organizational and geographic boundaries and can offer employees access to desired information. Other such computer applications provide tools and functionality relating to project management and execution.

The SharePoint family of products and services from Microsoft Corporation is an example of one such application, which provides a foundation platform for building flexible and scalable Internet-based business applications. SharePoint provides administrative controls for managing storage and Internet infrastructure and gives IT departments a cost-effective way to implement and manage a high-performance collaboration environment. The SharePoint server provides server capabilities that can influence organizational effectiveness by including content management and enterprise search functionality, accelerating shared business processes, and facilitating information-sharing across networks for enhanced business insight. These tools may be supported over Intranet, extranet, and Web applications across an enterprise within one integrated platform, without relying on separate fragmented systems. The collaboration and content management server provides IT professionals and developers with the platform and tools necessary for server administration, application extensibility, and interoperability.

The Project family of products and services from Microsoft Corporation is another example of such an application, which provides organizations and business units project management tools for managing schedules, budgets, and timeframes of various projects. Project includes tools and functionality directed towards informing and controlling project work, schedules, and finances, and keeping project teams aligned and in communication.

However, although SharePoint and Project provide certain functions, additional features and functionality that are not offered by these or other existing products or services are desirable. For example, there is a need for such management and efficiency related computer applications that further provide program-level hierarchy and security, customized user portal, milestone tracking capabilities, and customizable workflows. Additionally, there is a need for such computer applications that are focused on the specialized demands that arise from mergers and acquisitions.

Therefore, there is a need for an improved software toolkit for leveraging existing application functionality with customized functionality that is not currently available. A toolkit directed towards managing business processes that further provides program-level hierarchy and security, customized user portal, milestone tracking capabilities, and customizable workflows would be beneficial. Moreover, there is a need for a merger integration toolkit that is customized to address the particular requirements of the business processes and the IT requisites for businesses engaged in a merger or acquisition.

BRIEF SUMMARY OF THE INVENTION

The present invention is generally directed towards facilitating and assisting individuals with integrating business after a merger, acquisition, or similar event. Various embodiments of the present invention may be implemented, which may include one or more of the following functionalities: program management and program-level hierarchy and security, customized user portal with security-driven navigation, milestone tracking, linkage or integration with other project-related software programs, implementation management and merger-specific functions, automated intelligent clean room management, and customizable workflow configuration.

In accordance with one embodiment of the present invention, a method in a computer system is provided for executing a merger integration of businesses after a merger or acquisition between the businesses. A Merger Integration Toolkit of the present invention is established for providing assistance with integrating the businesses.

The present invention provides for a method and a computer system for providing functionality for electronically managing and supporting a merger integration of businesses, using software and other computer-implemented tools. In one aspect of the invention, the method and system provide program milestone tracking for an integration of businesses, where the businesses are subject to a merger or acquisition. The system provides a collaboration environment computer program for assisting a group of individuals performing the integration of businesses. The collaboration environment computer program provides administrative controls and communication among the group of individuals. A project management computer program assists the group of individuals and is configured to manage project schedules, budgets, and timeframes. A program milestone component is established and configured to facilitate creating and tracking program milestones for the collaboration environment computer program. The program milestone component also configured to interface the collaboration environment computer program and the project management computer program such that the collaboration environment computer program directly links to the project management computer program and receive program milestone updates.

BRIEF DESCRIPTION OF THE DRAWINGS

FIG. 18 is a diagram of an exemplary user interface Incident Tracking screen of the Merger Integration Toolkit, illustrating an incident tracking list in accordance with one specific implementation;

FIG. 19 is a diagram of an exemplary user interface Communication Tracking form of the Merger Integration Toolkit, illustrating editable fields for details of a communication tracking item in accordance with one specific implementation;

FIG. 22 is a diagram of an exemplary user interface Analysis Request screen of the Merger Integration Toolkit, illustrating details of an analysis request in accordance with one specific implementation;

FIG. 23 is a diagram of an exemplary user interface Clean Room Access Rights Assignment screen of the Merger Integration Toolkit, illustrating configuration of field-level security settings in accordance with one specific implementation;

DETAILED DESCRIPTION OF THE INVENTION

A. Merger Integration Toolkit Overview

Embodiments of the present invention as described herein enable individuals involved with a merger integration to effectively and securely manage, organize, and implement process steps relevant to a merger integration execution in a facilitated manner. The various embodiments of the present invention provide methods and related tools and electronic resources that utilize a Merger Integration Toolkit to guide managers and team members through the different process steps and phases of a merger integration life cycle, enabling the performance of the integration successfully and rapidly.

In one embodiment, the Merger Integration Toolkit of the present invention may be implemented in the context of a pre-defined merger integration framework, which is described in more detail in U.S. patent application Ser. No. 11/606,438, filed Nov. 30, 2006, entitled "Merger Integration Framework and Tool," and which claims the benefit of U.S. Provisional Application Nos. 60/741,008, filed Nov. 30, 2005 and 60/740,703, filed Nov. 30, 2005, the contents of which are incorporated herein in their entirety. The merger integration framework provides a structured method and computer system for navigating an electronic methodology tool for a merger integration of businesses.

Figure 9:
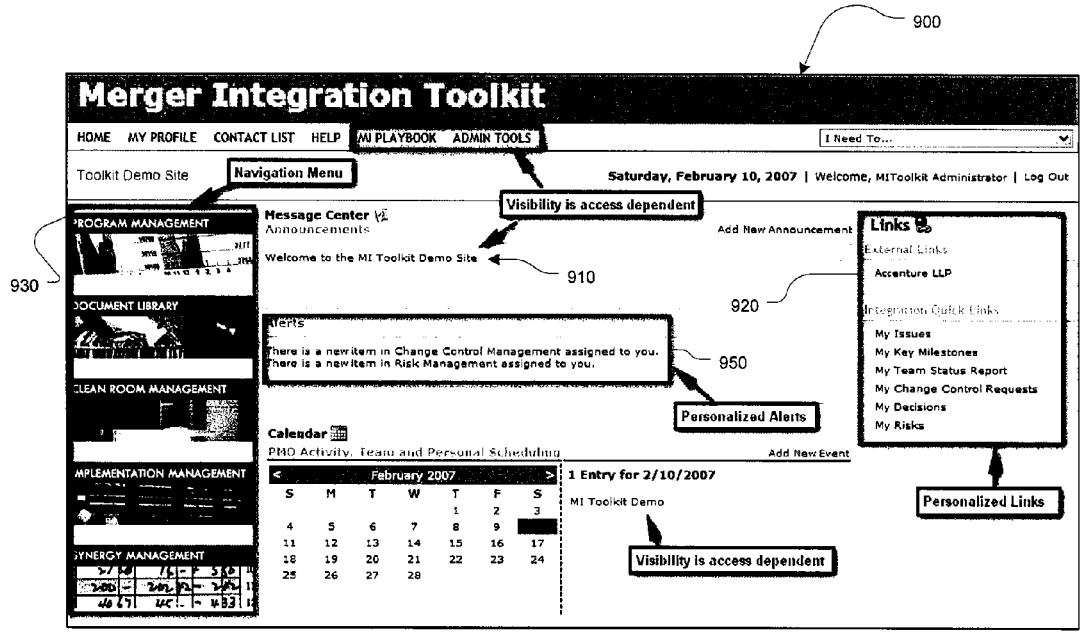
FIG. 9 is a diagram of an exemplary user interface Landing Page screen of the Merger Integration Toolkit, illustrating a customized user portal in accordance with one specific implementation.

As used herein, a "Merger Integration Toolkit" is a collection of related functionality for electronically managing and supporting a merger integration of businesses, using software and other computer-implemented tools. In one embodiment, a user interacts with a user interface of the Merger Integration Toolkit, where in one example the user visually navigates the toolkit from a Landing Page screen 900, as seen in FIG. 9. The various tools that comprise the toolkit, which are described in more detail below, are accessible to the user from the Landing Page.

The Merger Integration Toolkit of the present invention is generally directed towards customizing, enhancing, and supplementing computer applications that increase the efficiency of generic business processes, provide communication and connectivity for collaborative tasks, and manage projects. Examples of such computer applications include the Microsoft SharePoint and Project products. The present invention customizes, enhances, and supplements such applications with additional features and functionality that not offered by existing products or services. The Microsoft SharePoint and Project products are used as exemplary tools that may be improved by the present invention. However, those skilled in the art will appreciate that other suitable computer programs may likewise benefit from the functions of present invention described herein and that SharePoint and Project are discussed merely as exemplars.

As described in more detail below, the Merger Integration Toolkit of the present invention may improve such management and efficiency-related computer applications by providing program-level hierarchy and security, a customized user portal, milestone tracking capabilities, and customizable workflows. The Merger Integration Toolkit may additionally focus such computer applications on the specialized demands that arise from mergers and acquisitions.

B. Program-Level Hierarchy and Security

In one aspect of the present invention, a robust program-level hierarchy and security layer is configured to operate on top of SharePoint, or other suitable application, as a customized solution. The Merger Integration Toolkit leverages existing SharePoint functionality and establishes a custom layer of security and program management hierarchy on top thereof. The core SharePoint features and functionality are retained. In one embodiment, the Merger Integration Toolkit provides five layers of hierarchy in which information may be captured and reported via SharePoint.

Figures 1, 2:
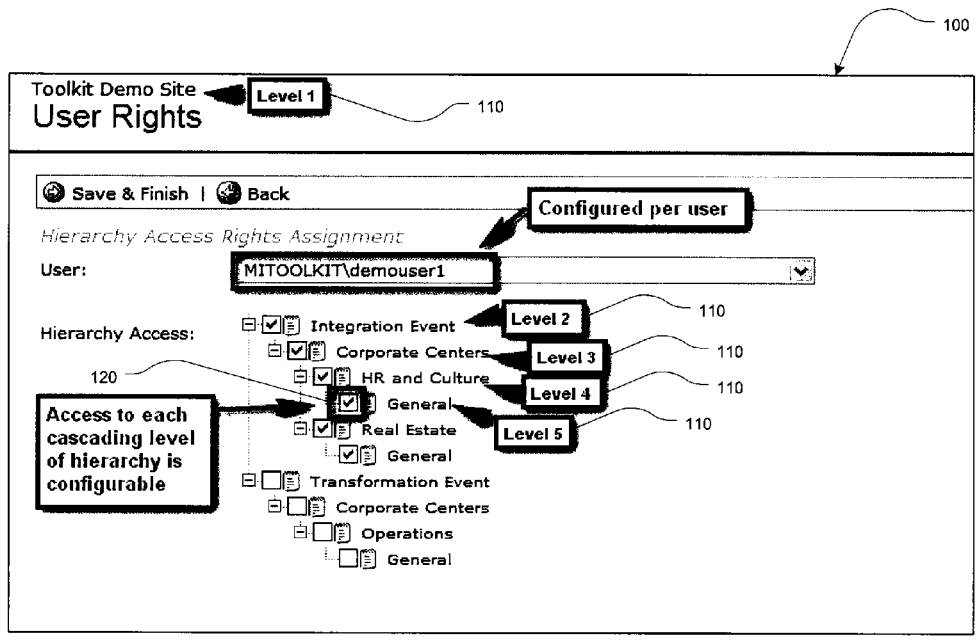
FIG. 1 is a diagram of an exemplary user interface User Rights screen of the Merger Integration Toolkit, illustrating hierarchy levels and configuration per user in accordance with one specific implementation.
FIG. 2 is a diagram of an exemplary user interface Issue Management screen of the Merger Integration Toolkit, illustrating restriction of items in lists by the access level granted to a user in accordance with one specific implementation.

Referring to FIG. 1, a diagram of an exemplary user interface User Rights screen 100 of the Merger Integration Toolkit is shown, illustrating hierarchy levels and configuration per user in accordance with one specific implementation of the present invention. Examples of five hierarchy levels or layers 110 are shown in FIG. 1, as configured based on user "demouser1." The naming convention of each hierarchy layer 110 is flexible and users may adapt the levels 110 to fit their needs. Access to each cascading level of hierarchy, such as General item 120 at Level 5, is individually configurable. The following code snippet illustrates exemplary code for configuring hierarchy levels 110:

```
<?xml version="1.0" encoding="utf-8"?>
<configuration>
    <appSettings>
        <add key="Level0" value="Program"/>
        <add key="Level1" value="Event"/>
        <add key="Level2" value="Area"/>
        <add key="Level3" value="Team"/>
        <add key="Level4" value="Project"/>
```

Security in the Merger Integration Toolkit is flexible and may be applied to a level of hierarchy and/or to a defined group within a specified layer. Access to information is then determined by the level of security access a user is provided by the administrator and how items are coded from a hierarchical metadata perspective.

FIG. 2 is a diagram of an exemplary user interface Issue Management screen 200 of the Merger Integration Toolkit, illustrating restriction of items 210 in lists by the access level granted to a user in accordance with one specific implementation of the present invention. Security functions may also be applied to individual functions or sections, restricting access per user and to three levels, such as Read/Write, Read Only, and No Access. A user may only view items 210 that are coded with hierarchy values to which that user has access. In addition, a custom security code may be included in each page to protect against direct URL access to items and functions to which a user does not have access, as shown in FIGS. 3-6 below.

Figure 3:
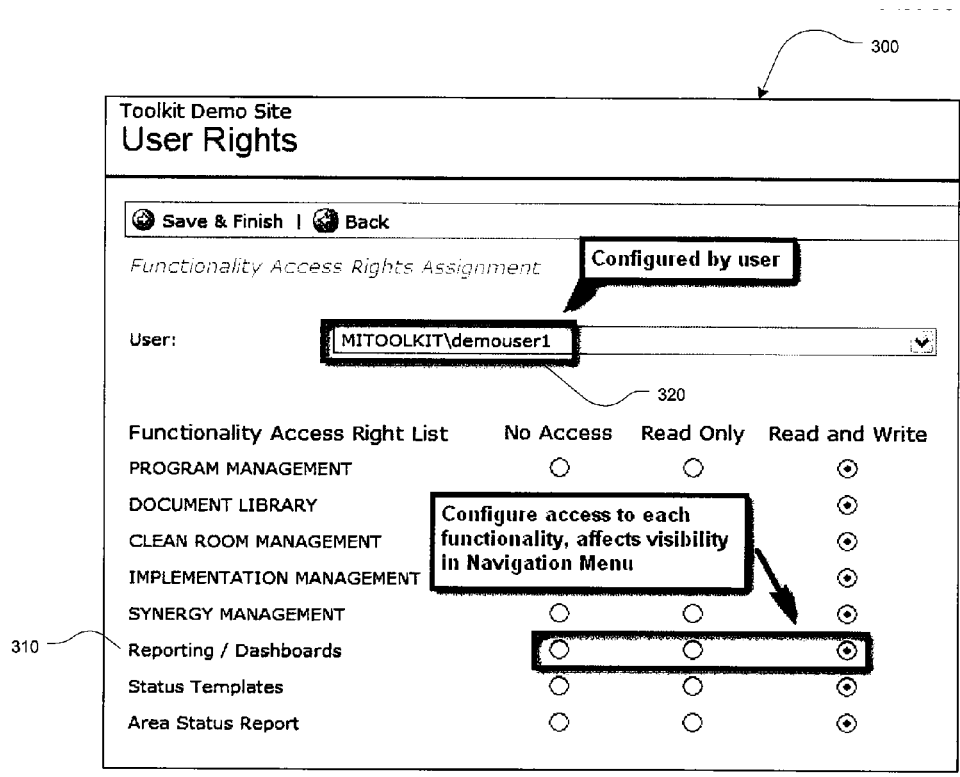
FIG. 3 is a diagram of an exemplary user interface User Rights screen of the Merger Integration Toolkit, illustrating configuration of user functionality access rights by administrator in accordance with one specific implementation.

Referring to FIG. 3, a diagram of an exemplary user interface User Rights screen 300 is shown, illustrating configuration of user functionality access rights by an administrator in accordance with one specific implementation of the present invention. Access to each functionality, such as Reporting/Dashboards 310, may be configured by an administrator or other appropriate person as desired, thereby affecting the visibility of such functionality in a Navigation Menu to the selected user 320.

Figure 4:
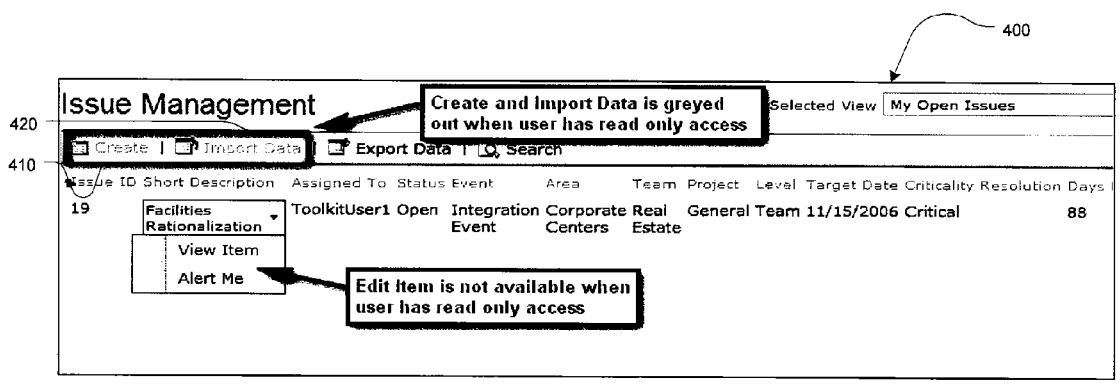
FIG. 4 is a diagram of an exemplary user interface Issue Management screen of the Merger Integration Toolkit, illustrating a list view for a read-only access user in accordance with one specific implementation.

FIG. 4 is a diagram of an exemplary user interface Issue Management screen 400 of the Merger Integration Toolkit, illustrating a list view for a read-only access user in accordance with one specific implementation of the present invention. When the user has Read Only access, screen selections such as create 410 and import data 420 are grayed out and are unselectable. The Edit Item screen selection (not shown) does not appear and is not available when a user has Read Only access.

Figure 5:
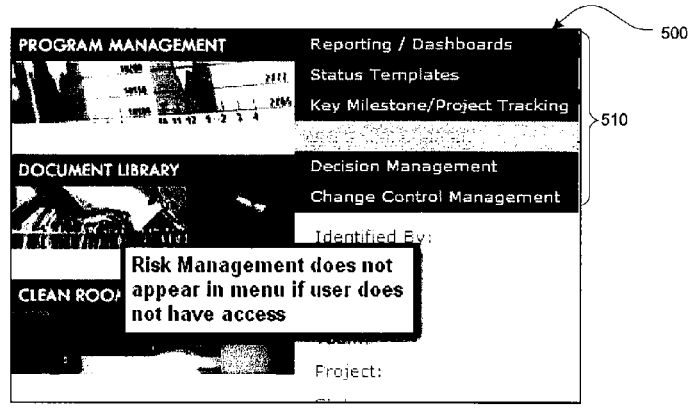
FIG. 5 is a diagram of an exemplary user interface Navigation Menu screen of the Merger Integration Toolkit, illustrating that navigation menu items are not displayed for functions to which the user has no access in accordance with one specific implementation.

FIG. 5 is a diagram of an exemplary user interface Navigation Menu screen 500 of the Merger Integration Toolkit, illustrating that navigation menu items 510 are not displayed to a user for functions to which the user has no access. The navigation menu items would otherwise include Risk Management; in the Navigation Menu screen 500 the user does not have the appropriate access and Risk Management is not displayed.

Figure 6:
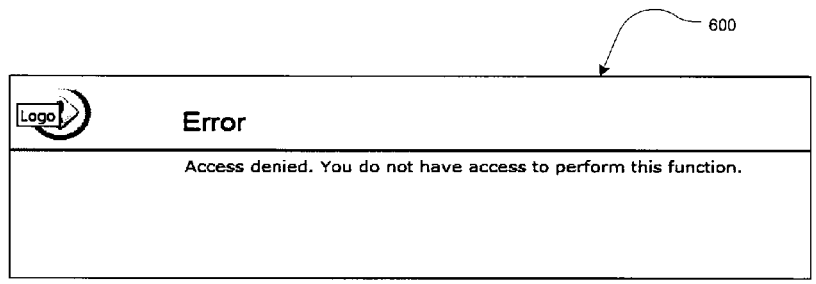
FIG. 6 is a diagram of an exemplary user interface Error message of the Merger Integration Toolkit, illustrating how attempts to access items using a direct URL are restricted based on access rights in accordance with one specific implementation.

FIG. 6 is a diagram of an exemplary user interface Error message 600 of the Merger Integration Toolkit. Attempts to access items using a direct URL are restricted based on access rights, and error message 600 may be displayed to the user if an unauthorized function is attempted.

Figure 7:
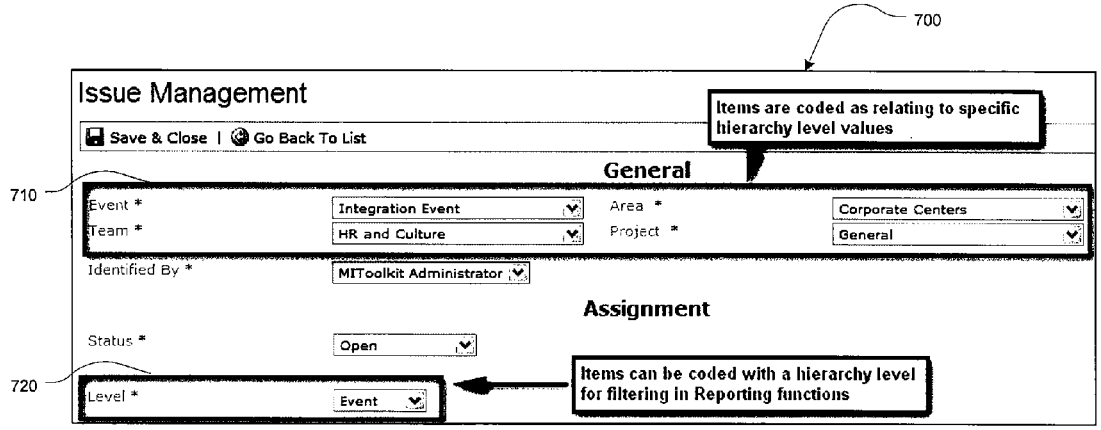
FIG. 7 is a diagram of an exemplary user interface Issue Management screen of the Merger Integration Toolkit, illustrating how items may be coded by hierarchy and level in accordance with one specific implementation.

FIG. 7 is a diagram of an exemplary user interface Issue Management screen 700 of the Merger Integration Toolkit, illustrating how items may be coded by hierarchy and level in accordance with one specific implementation of the present invention. For example, item 710 may be coded to indicate the associated hierarchy/level values for each of program, event, area, team, and project. Additionally, items may be coded with a hierarchy level 720 for subsequent filtering implemented by the reporting functions. Reporting and tracking may then be performed by hierarchy level, and the items captured in the SharePoint lists and document libraries are restricted by the defined security layer 720.

Figure 8:
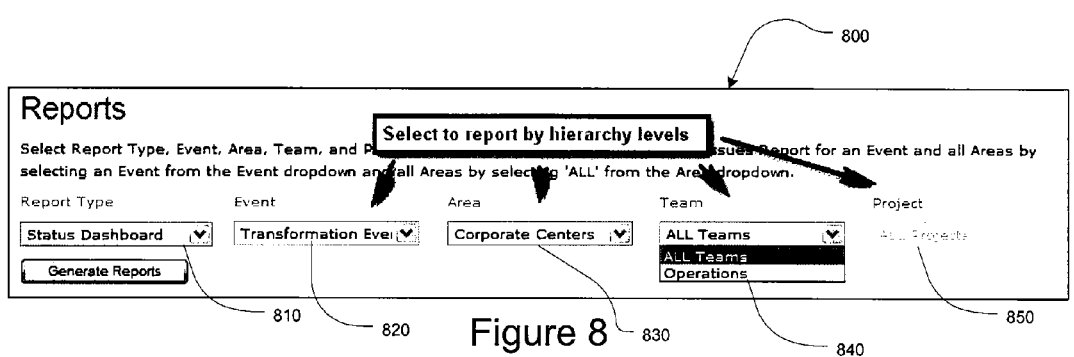
FIG. 8 is a diagram of an exemplary user interface Reports screen of the Merger Integration Toolkit, illustrating selection of reports by hierarchy levels in accordance with one specific implementation.

FIG. 8 is a diagram of an exemplary user interface Reports screen 800 of the Merger Integration Toolkit, illustrating selection of reports by hierarchy levels in accordance with one specific implementation. In addition to selecting a report type 810, a user may further select a report by hierarchy levels, including event 820, area 830, team 840, and project 850. In this manner, reporting may be accessed and filtered by hierarchy as shown in FIG. 8.

C. Customized User Portal with Security-Driven Navigation

In another aspect of the present invention, the Merger Integration Toolkit provides a customized user interface portal for SharePoint, with security-driven navigation. The custom user interface portal may be developed in SharePoint or other suitable application, and it leverages the security and hierarchy layers described above to ensure a user's experience provides the user with available functionality. The portal is a custom front-end component for SharePoint or other suitable application and is configured as a wrapper for the application that restricts a user's visual interaction with the application.

For example, FIG. 9 is a diagram of a user interface Landing Page screen 900 of the Merger Integration Toolkit, illustrating a customized user portal in accordance with one specific implementation of the present invention. As seen therein, the Events and Announcements section 910 only displays to users those items that are assigned to hierarchy level(s) to which the user has access, and the Links section 920 displays links personalized for the applicable user.

Figure 10:
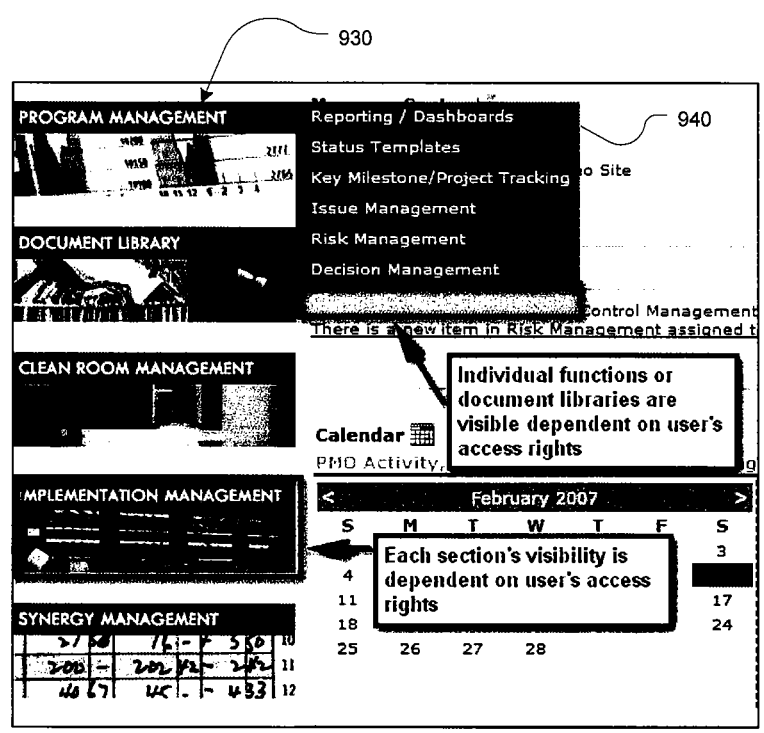
FIG. 10 is a diagram of an exemplary user interface Navigation Menu screen of the Merger Integration Toolkit, illustrating a configurable navigation menu in accordance with one specific implementation.

The Landing Page screen 900 contains a navigation menu 930 that contains links to custom Merger Integration Toolkit functions. FIG. 10 is a detailed diagram of a navigation menu 930 in expanded mode, illustrating a configurable navigation menu. The navigation menu 930, upon being expanded, only displays to a user the functions 940 to which the user has been provided access, as shown in FIG. 10. Individual functions 940 and document libraries are visible dependent on a user's access rights. The visibility of functions and libraries for each of the various sections of the navigation menu 930 are similarly dependent on a user's access rights. The mechanism by which access may be provided to such functions is described above.

Figure 11A:
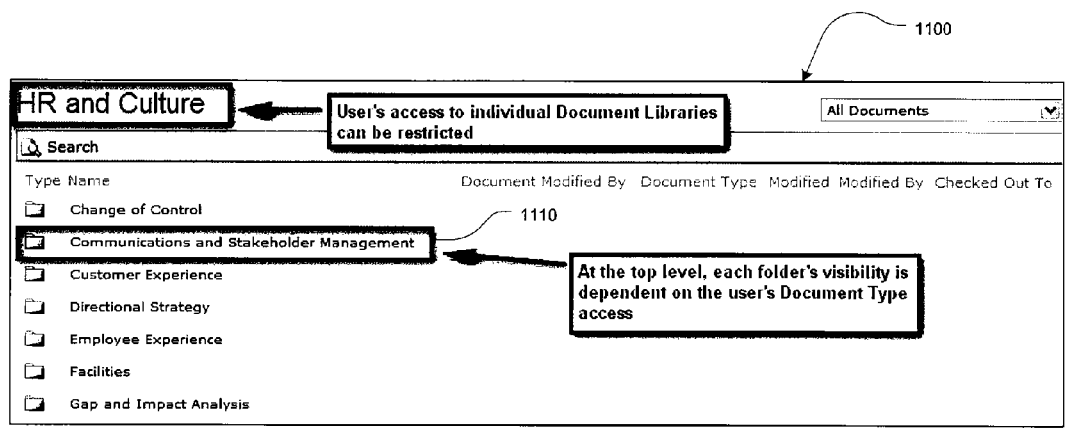
FIG. 11a is a diagram of an exemplary user interface document library screen of the Merger Integration Toolkit, illustrating a document library and folder customized view in accordance with one specific implementation.
Figure 11B:
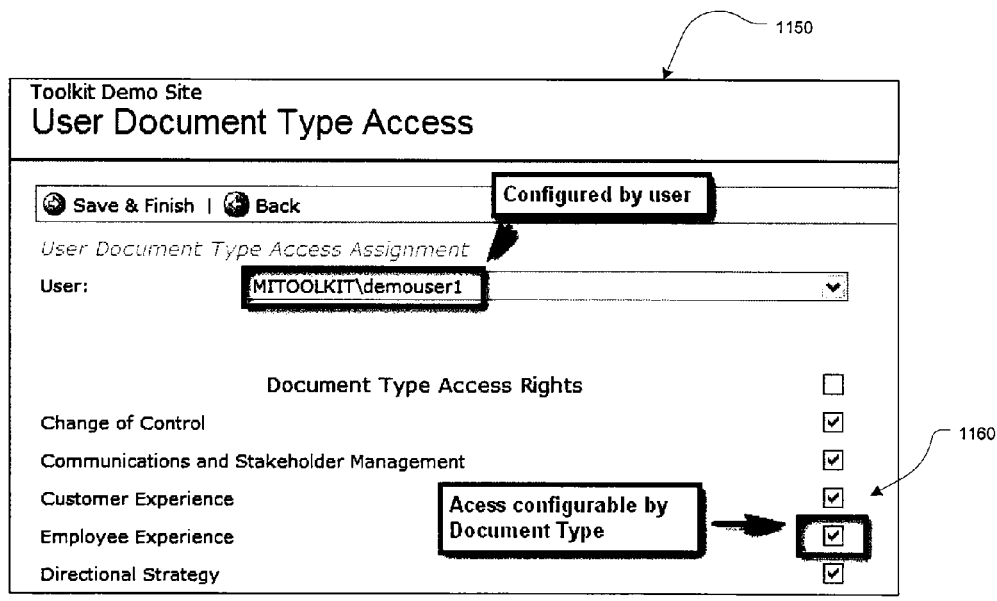
FIG. 11b is a diagram of an exemplary user interface document access configuration screen of the Merger Integration Toolkit, illustrating configuration of a user's document folder rights in accordance with one specific implementation.

A deliverables library, or document library, displays the folders to which a user has been assigned access by the administrator. Each document library may restrict a user's hierarchy access rights in conjunction with standard SharePoint site group security. For example, FIG. 11a shows an exemplary user interface document library screen 1100 of the Merger Integration Toolkit, illustrating a document library and folder customized view. At the document library top level 1110, the visibility of each folder is dependent on the user's document type access setting. Referring to FIG. 11b, a diagram of an exemplary user interface document access configuration screen 1150 is shown, illustrating configuration of a user's document folder rights. Document access rights 1160 are therein configurable by document type for demouser1.

In addition, a custom notification services program of the Merger Integration Toolkit is provided to interact with the SharePoint user interface. The custom notification services program provides for notification to users of items assigned to them, past due items, items awaiting approval in workflow, etc. Referring again to FIG. 9, the Landing Page screen 900 includes a message center window 950 in the user portal that illustrates exemplary user notifications and alerts of relevant items. In one embodiment, the notification services program run nightly to remove old items and/or to assign items to past due status dependent on the due dates assigned for each item. The recurrence timing may be configurable. As new items are added or assigned, the notification services program adds them in real-time to each users' notification window pending a refresh.

D. Flexible Program Milestone Tracking Capabilities

In another aspect of the present invention, the Merger Integration Toolkit provides flexible program milestone tracking capabilities, including a custom linkage between the Merger Integration Toolkit, using SharePoint, and a Microsoft Project Server. The Toolkit provides flexible methods for creating and tracking milestones to enable organizations to find the appropriate method for their requirements. The linkage of SharePoint and a Microsoft Project Server facilitates effective and efficient information management.

Figure 12:
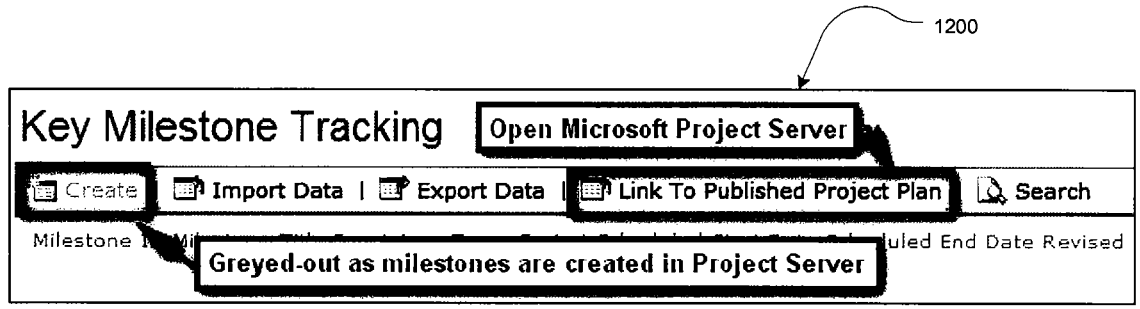
FIG. 12 is a diagram of an exemplary user interface Key Milestone Tracking screen of the Merger Integration Toolkit, illustrating a direct link to Microsoft Project Server in accordance with one specific implementation.
Figure 13:
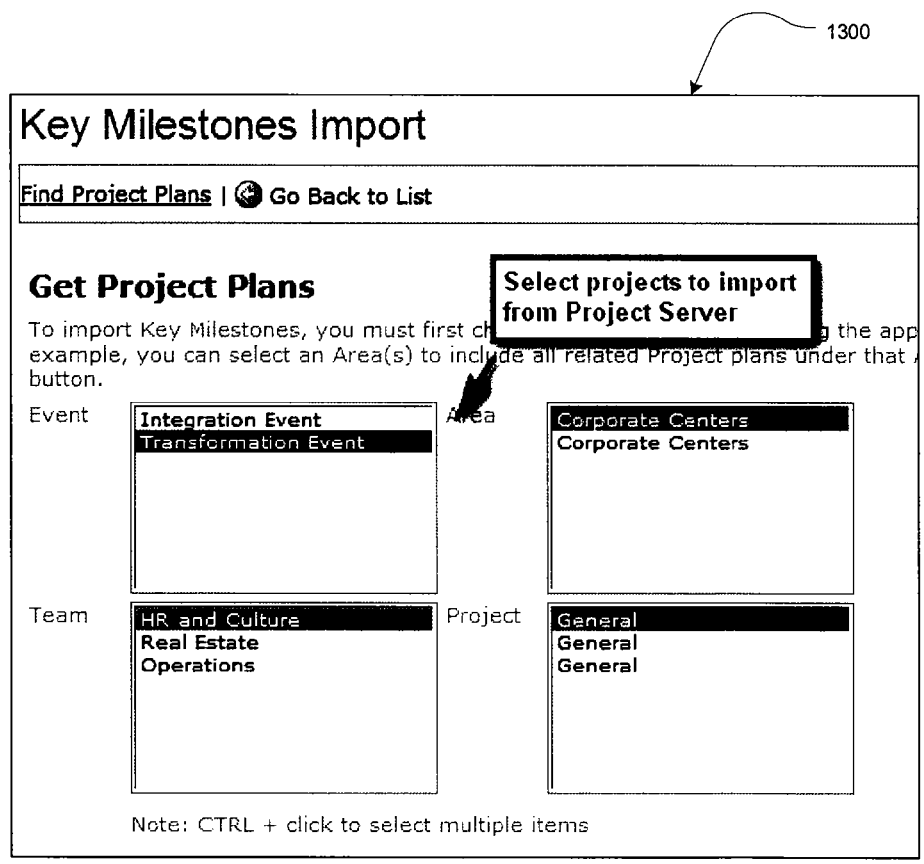
FIG. 13 is a diagram of an exemplary user interface Key Milestone Import screen of the Merger Integration Toolkit, illustrating the selection of project information to import from Microsoft Project Server in accordance with one specific implementation.
Figures 14, 15:
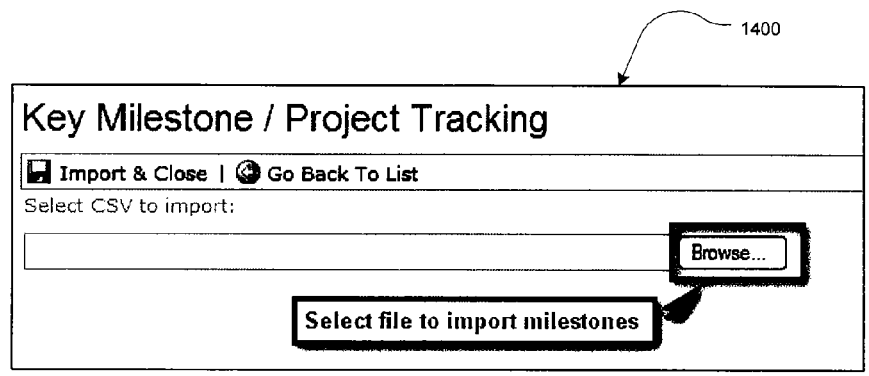
FIG. 14 is a diagram of an exemplary user interface Key Milestone/Project Tracking screen of the Merger Integration Toolkit, illustrating the importation of milestones from a file in accordance with one specific implementation.
FIG. 15 is a diagram of an exemplary user interface Integration Event Milestone screen of the Merger Integration Toolkit, illustrating milestone reporting by hierarchy in accordance with one specific implementation.

The Toolkit may be configured to allow updates to milestones directly in the Toolkit, which may be uploaded from a file. For example, milestone updates may be received by the Toolkit via direct linkage from Microsoft Project Server Edition. From a Key Milestone Tracking screen 1200 shown in FIG. 12, the Toolkit may be instructed to directly link to a Published Project Plan of a Microsoft Project Server. FIG. 13 is a diagram of an exemplary user interface Key Milestone Import screen 1300, illustrating the selection of project information from a Project Plan to import from Microsoft Project Server. Alternatively, a spreadsheet file or a Microsoft Project file may be uploaded through an import interface. Referring to FIG. 14, an exemplary user interface Key Milestone/Project Tracking screen 1400 is shown, illustrating the importation of milestones from a file. The following code snippet illustrates configuration of a Merger Integration Toolkit project milestone scenario:

```
<?xml version="1.0" encoding="utf-8"?>
<configuration>
    <appSettings>
        <add key="ProgramName" value="Accenture Merger
        Integration Toolkit"/>
        <add key="SiteDescription" value="Demo"/>
        <add key="ProjectIntegrationScenario" value="C"/>
        <add key="ProjectServer"
        value="http://mitoolkit/ProjectServer"/>
        <add key="ProjectServerExternal"
        value="http://mitoolkit/ProjectServer"/>
```

The direct linkage with a Microsoft Project Server provides for a seamless experience whereby a user may manage and report on milestones and projects using Microsoft Project, leveraging all of its functions, project plan integration, and rollup capabilities while flagging and linking the key items for import directly to the Merger Integration Toolkit. Once imported, the milestones may be tracked as part of the critical path for a merger integration and included as part of the Executive Reporting functionality of the Merger Integration Toolkit, as seen in FIG. 15. FIG. 15 is a diagram of an exemplary user interface Integration Event Milestone screen 1500, illustrating milestone reporting by hierarchy. The Integration Event Milestone screen 1500 may display milestones based on due date, seen at section 1510. Further milestones in the Merger Integration Toolkit may be reported or filtered by hierarchy levels 1520, such as event, area, team, and project. Additionally, milestone IDs 1530 may link back to the original milestone details existing in the file or Project Server from which the milestone was uploaded.

E. Merger-Specific Implementation Functionality

In another aspect of the present invention, the Merger Integration Toolkit provides custom merger-specific implementation functionality developed within SharePoint or other suitable application. The Merger Integration Toolkit includes functions that are tailored to implementation management activities, which are distinct from the standard program management components. These customized functions manage detailed tasks and incidents as part of a transition event related to a merger or acquisition. The functions may include, for example, Detailed Schedule Tracking, Incident Tracking (during transition events), Key Performance Indicator Monitoring, and Communications Tracking. Other suitable functions may be included as needed.

Figure 16:
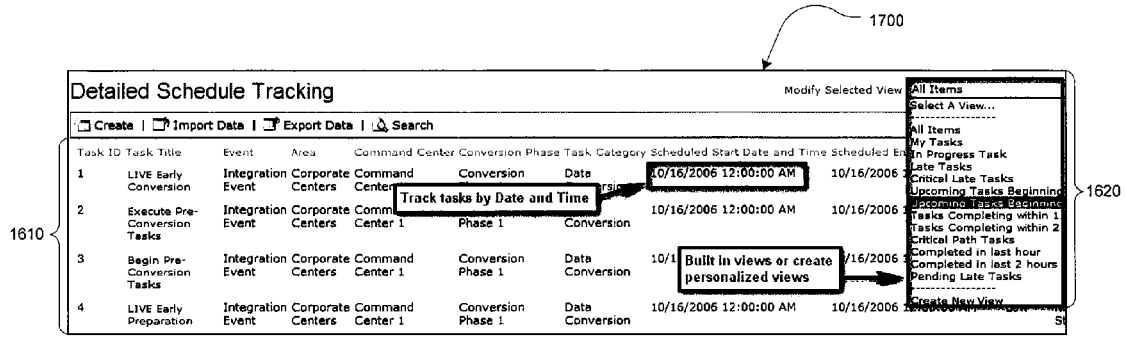
FIG. 16 is a diagram of an exemplary user interface Detailed Schedule Tracking screen of the Merger Integration Toolkit, illustrating a detailed schedule tracking list with built-in views in accordance with one specific implementation.

The detailed schedule tracking functionality allows real-time tracking of the specific tasks that need to be performed during a merger integration event and may include built-in views that highlight upcoming or overdue tasks. For example, FIG. 16 is a Detailed Schedule Tracking screen 1600, illustrating a detailed schedule tracking list with built-in views. Tasks 1610 may be tracked by date and time. The available views 1620 may be built-in or, alternatively, personalized views may be created by a user where appropriate.

Figure 17:
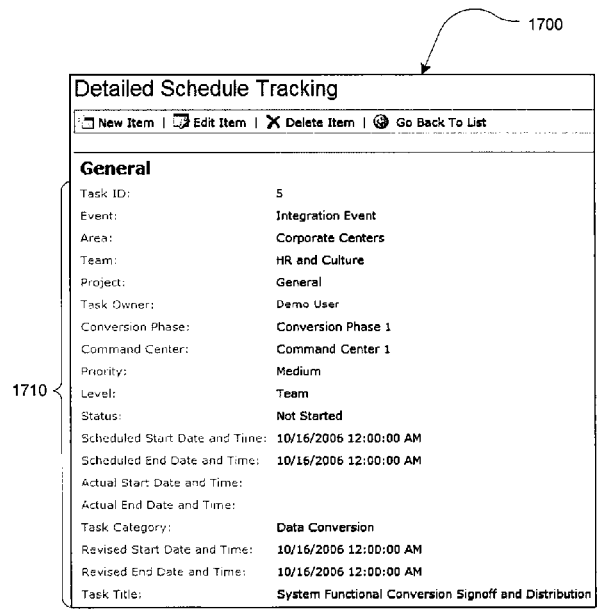
FIG. 17 is a diagram of an exemplary user interface Detailed Schedule Tracking screen of the Merger Integration Toolkit, illustrating detailed item schedule tracking in accordance with one specific implementation.
Figures 18, 19:
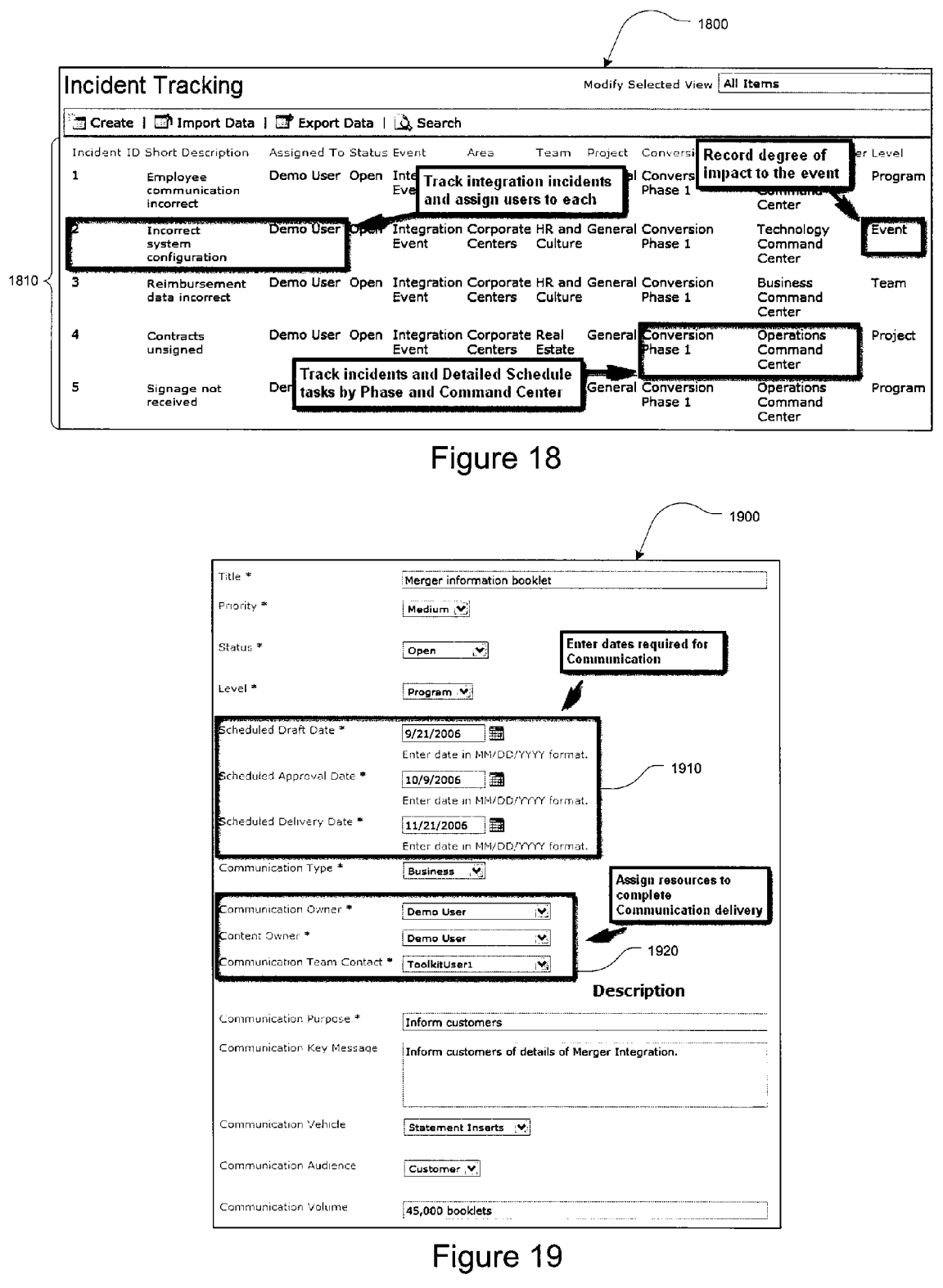

FIG. 17 is a Detailed Schedule Tracking screen 1700 of the Merger Integration Toolkit, illustrating a detailed schedule tracking list 1710. The Merger Integration Toolkit also provides for incident tracking functionality that tracks incidents related to tasks executed as part of an integration event, e.g., tasks that may be tracked in the detailed schedule tracking list 1710. As seen in FIG. 18, an Incident Tracking screen 1800 displays an incident tracking list 1810. The list 1850 tracks incidents, which may be assigned to a user. In the example shown in FIG. 18, all incidents are assigned to "Demo User." The list 1850 tracks detailed schedule tasks by phase and command center, and records the degree of impact to the relevant event.

Communications during a merger integration may be tracked by volume, audience, and the various dates by which drafts and final distribution need to take place, among other criteria. FIG. 19 is a diagram of a Communication Tracking form 1900 of the Merger Integration Toolkit, illustrating editable fields for details of a communication tracking item. For example, date fields 1910 may be required for communications. Additionally, assignment of resources 1920 may also be required to complete communication delivery.

Figures 20, 21:
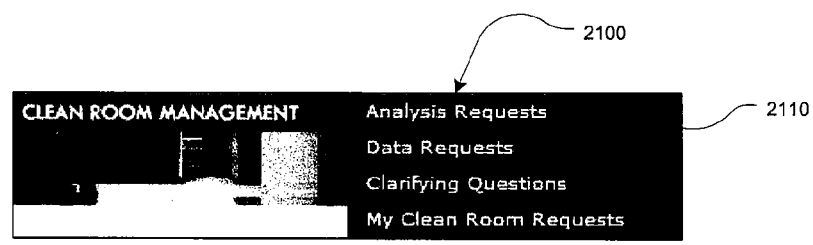
FIG. 20 is a diagram of an exemplary user interface Key Performance Indicator screen of the Merger Integration Toolkit, illustrating editable fields for details for a Key Performance Indicator record in accordance with one specific implementation.
FIG. 21 is a diagram of an exemplary user interface Clean Room Management menu field of the Merger Integration Toolkit, illustrating a clean room navigation menu in accordance with one specific implementation.

Additional functionality of the Merger Integration Toolkit includes tracking performance of an organization following a transition event for a period post-transition to ensure that the business remains stable. For example, Key Performance Indicator (KPI) Monitoring may be performed where appropriate. FIG. 20 shows a Key Performance Indicator screen 2000, illustrating editable fields for details for a Key Performance Indicator record. A user may enter a current status and metric 2010 for a KPI, and a user may also attach a metric tracker 2020 or other file where suitable.

The foregoing functions are not otherwise available in merger integration tools and provide both business and technical schedule and incident tracking. These functions are built on top of standard list functions from SharePoint or other suitable applications and allow tracking by transition event and implement the same hierarchy and security structures as previously described.

F. Automation of Intelligent Clean Room Functionality

In another aspect of the present invention, the Merger Integration Toolkit provides automation of intelligent clean room functionality.

The intelligent clean room functionality manages information and analysis requests in the period between merger announcement and change of control. Data during this period may be extremely sensitive and a "clean" environment and associated processes have been defined. The Merger Integration Toolkit of the present invention contains functionality to track requests for analysis, data and other information to support the intelligent clean room requirements.

The automated intelligent clean room functionality provides users with the ability to track information separately from the core user base. Additional security may be provided to separate these functions from the remainder of the Merger Integration Toolkit functionality. Additionally, automated intelligent clean room functionality and configuration of the Merger Integration Toolkit allow for multiple server configuration scenarios in support of the clean room where the clean room functions run on a separate instance of the Merger Integration Toolkit on a separate, secured server.

Referring to FIG. 21, a diagram of an exemplary Clean Room Management menu field 2100 is shown, illustrating a clean room navigation menu. The menu field 2100 includes a user sub-menu selection 2110 for analysis requests, the selection of which displays an Analysis Request screen 2200 to the user, as seen in FIG. 22. The Analysis Request screen 2200 displays details of an analysis request to the user.

The clean room functionality may be controlled by an automated workflow, as described in more detail below, which may be developed within the Merger Integration Toolkit to support the intelligent clean room and other functions. Field-level security may be provided to the clean room forms for configuring which users are able to access specific fields on the clean room forms. FIG. 23 is a diagram of a Clean Room Access Rights Assignment screen 2300, which is a user interface for configuring field-level security settings.

F. Robust and Customizable Workflow

In another aspect of the present invention, the Merger Integration Toolkit provides robust and customizable workflow functionality that may be developed in SharePoint or other suitable application. In this aspect, the Merger Integration Toolkit employs a broadly customizable workflow function, which may be developed on top of SharePoint Content Approval or other suitable component to support merger integration functions, particularly the clean room functions as described above. The workflow function may be established by a user for six or more functions in the Merger Integration Toolkit as necessary; including Decision Management, Communications Tracking, Change Control Management, and the Clean Room functions (Analysis Requests, Data Requests and Clarifying Questions).

Workflow functionality enables items to be move automatically through an approval process. Throughout the approval process steps, personalized notifications are displayed to the user, for example on the Landing Page screen 900, indicating that items are awaiting the user's approval or that emails are awaiting the user's attention. The user interface that handles the workflow approval process is shown below in FIGS. 24-26. With initial reference to FIG. 24, a diagram of an exemplary user interface Message Center window 950 of the Landing Page screen 900 is shown, illustrating items awaiting workflow approval by a user.

Figure 24:
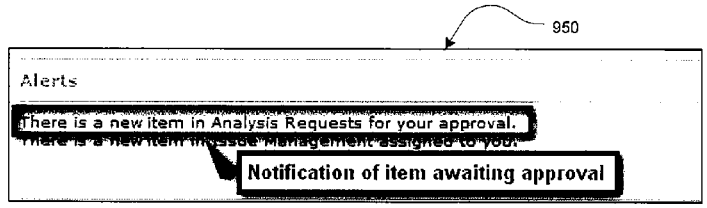
FIG. 24 is a diagram of an exemplary user interface Message Center window of the Landing Page screen of FIG. 9, illustrating items awaiting workflow approval in accordance with one specific implementation.
Figure 25:
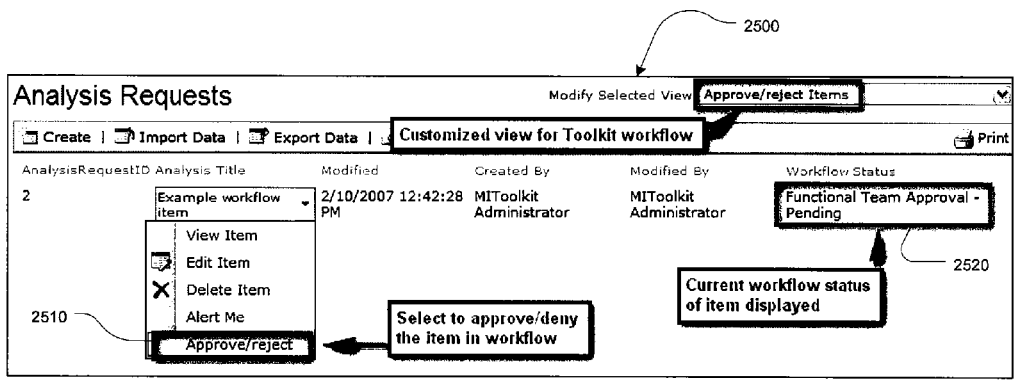
FIG. 25 is a diagram of an exemplary user interface Analysis Request screen of the Merger Integration Toolkit, displaying items in workflow awaiting approval and illustrating an approve/reject view in accordance with one specific implementation.
Figure 26:
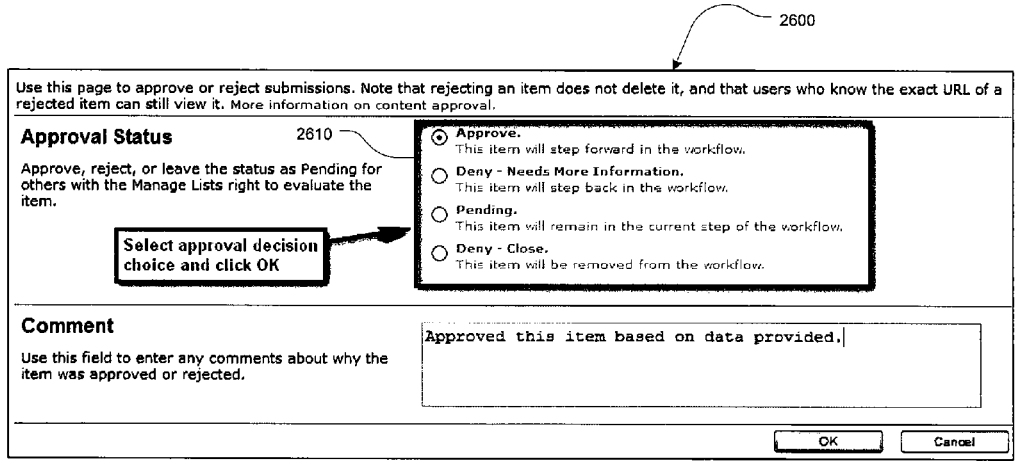
FIG. 26 is a diagram of an exemplary user interface Workflow Approval screen of the Merger Integration Toolkit, illustrating a workflow moderation interface in accordance with one specific implementation.

For example, when a user receives an Analysis Request requiring the user's approval, a notification of the request is displayed in the Message Center window 950, as seen in FIG. 24. Upon selection by the user of the analysis request notification, the Toolkit displays an Analysis Request screen 2500 to the user, as shown in FIG. 25. The Analysis Request screen displays items awaiting the user's approval. The user may selected an approve/reject object 2510 in the workflow to address the item. The Toolkit may further display to the user a current workflow status 2520 of the item. Upon selection of the approve/reject object 2510, a Workflow Approval screen 2600 is displayed to the user, illustrating a workflow moderation interface, as seen in FIG. 26. In a selection object 2610, the user may indicate whether the item is approved, denied with more information needed, pending, or denied and closed. Additionally, the user may enter comments where appropriate to incorporate relevant information regarding the approve/reject determination.

A workflow of the present invention may be customized by allowing a user to create steps and designate single or multiple approvers for each step. The user may assign weights to each step to allow for flexible approver scenarios. For example, a user may indicate that a particular workflow item requires 2 of 3 possible approvers to move an item forward. A workflow of the present invention may also be made non-linear. For example, when an item is denied by a user the workflow may be configured to send the item back to a chosen step in the workflow and not just to the immediately preceding step.

Figure 27:
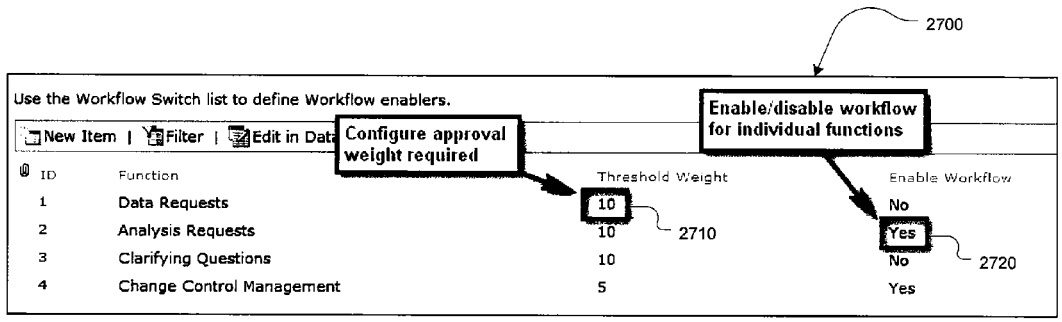
FIG. 27 is a diagram of an exemplary user interface Workflow Configuration screen of the Merger Integration Toolkit, illustrating an interface for configuration of workflow enable/disable and required approval weight in accordance with one specific implementation.

Referring to FIG. 27, a diagram of an exemplary Workflow Configuration screen 2700 is shown. The Workflow Configuration screen illustrates an interface for a user to enter a required approval weight setting 2710. Additionally, the Workflow Configuration screen provides an interface for a user to enable or disable the workflow requirements for individual functions with an enable/disable selection 2720.

Figure 28:
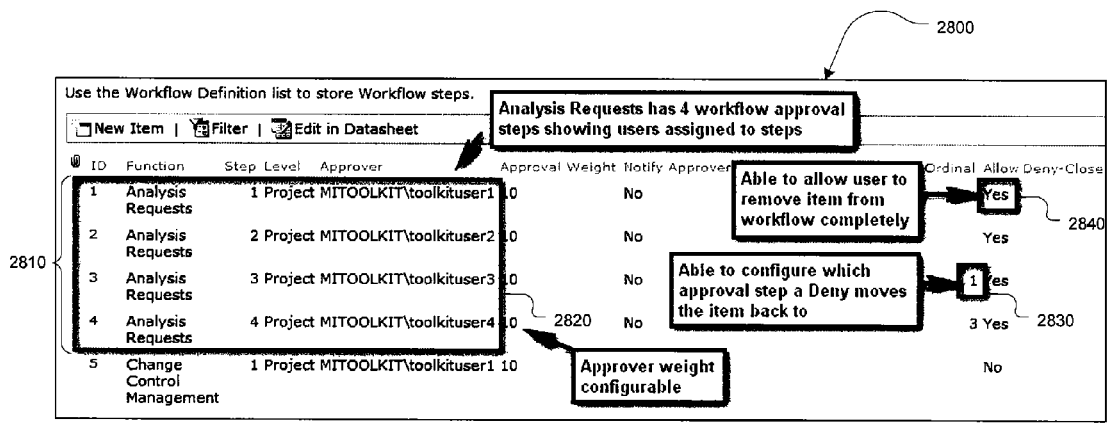
FIG. 28 is a diagram of another exemplary user interface Workflow Configuration screen of the Merger Integration Toolkit, illustrating an interface for configuration of workflow approval steps in accordance with one specific implementation.

Further, the present invention provides for an interface for configuring workflow approval steps. As seen in FIG. 28, a diagram of another exemplary user interface Work Configuration screen 2800 is shown. In this example, the user has configured an Analysis Request to include four workflow approval steps 2810, each of which have been assigned to four different users for approval: toolkituser1, toolkituser2, toolkituser3, and toolkituser4. The user may set the approver weights 2820 independently to each of the four steps. In the example shown in FIG. 28, each approver weight 2820 is set to 10, but other weights may be indicated by the user as desired. Additionally, Work Configuration screen 2800 provides the user with an Ordinal indicator 2830 that configures to which approval step an item is moved responsive to a Deny status selection from an approver.

Workflow Configuration screen 2800 further provides the user a Allow Deny-Close indicator 2840, which enables the user to determine independently for each workflow approval step 2810 whether the designated approver may remove the approval step from workflow completely. Customized security is built into the workflow of the present invention for preventing users that are not part of the current approval process flow from viewing an item in workflow until either the item requires the user's approval or the item has completed the entire approval process.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. An apparatus, comprising:
a collaboration environment computer unit configured to:
provide a toolkit incorporating customized functionality on top of functionality of one or more applications for assisting users in performing an integration of businesses subject to a merger or acquisition there between,
the customized functionality including a security layer and program milestone tracking not available in the one or more applications,
define a plurality of cascading hierarchy levels for the security layer reflecting a level of access users are granted to a plurality of items stored in a respective library of the one or more applications,
link to a project server associated with the one or more applications,
manage the plurality of items by leveraging the functionality of the one or more applications based on linking to the project server,
import the plurality of items to the toolkit based on managing the plurality of items,
encode the plurality of items with hierarchical metadata based on the plurality of cascading hierarchy levels,
the hierarchical metadata including hierarchy values such that a requesting user is denied access to a requested item when a hierarchy value of the requested item is inconsistent with a level of access corresponding to the requesting user,
create and track program milestones based on the plurality of items, and
generate and filter reports by each level in the cascading hierarchy levels based on the plurality of items that are encoded and the program milestones.

2. The apparatus of claim 1, where the program milestones define necessary steps for completing the merger or acquisition.

3. The apparatus of claim 1, where the collaboration environment computer unit is configured to:
receive updates to the program milestones by importing a file from the project server.

4. The apparatus of claim 1, where the collaboration environment computer unit directly links to the project server.

5. The apparatus of claim 1, further comprising:
an incident tracking unit that tracks incidents related to tasks executed as part of the integration,
where the program milestones are updated based on the incidents related to the tasks.

6. The apparatus of claim 1, further comprising:
a communications tracking unit that tracks communications by volume, audience, and due dates for the communications,
where the program milestones are updated based on the communications.

7. The apparatus of claim 1, further comprising:
a workflow unit configured to:
notify users that a task to be executed as part of the integration is ready for approval, and the users will approve or disapprove of the task by selecting an approve or reject object.

8. The apparatus of claim 7, wherein an approval process comprises a number of steps, and wherein the workflow unit assigns a weight to at least one of the steps.

9. The apparatus of claim 8, wherein the workflow unit, to perform the approval process, is configured to:
determine a total number of approvers for the task;
determine a minimum number of approvers, the minimum number being less than the total number; and
move to the next step in the approval process if the minimum number has approved the task by selecting an approve or reject object.

10. A method comprising:
providing, via a device, a toolkit incorporating customized functionality on top of functionality of one or more applications for users in performing an integration of businesses subject to a merger or acquisition there between,
the customized functionality including a security layer and program milestone tracking not available in the one or more applications,
defining, by the device, a plurality of cascading hierarchy levels for the security layer reflecting a level of access users are granted to a plurality of items stored in a respective library of the one or more applications,
linking, by the device, to a project server associated with the one or more applications,
managing, by the device, the plurality of items by leveraging the functionality of the one or more applications based on linking to the project server,
importing, by the device, the plurality of items to the toolkit based on managing the plurality of items,
encoding, by the device, the plurality of items with hierarchical metadata based on the plurality of cascading hierarchy levels,
the hierarchical metadata including hierarchy values such that a requesting user is denied access to a requested item when a hierarchy value of the requested item is inconsistent with a level of access corresponding to the requesting user,
creating and tracking, by the device, program milestones based on the plurality of items, and
generating and filtering, by the device, reports by each level in the cascading hierarchy levels based on the plurality of items that are encoded and the program milestones.

11. The method of claim 10, where the program milestones define necessary steps for completing the merger or acquisition.

12. The method of claim 10, further comprising:
receiving updates to the program milestones by importing a file from the project server.

13. The method of claim 10, further comprising:
receiving status information associated with tracking communications between users by at least one of volume, audience, or due date,
where tracking the program milestones is based on the status information.

14. The method of claim 10, where linking to the project server includes directly linking to the project server.

15. One or more non-transitory computer-readable media storing instructions, the instructions comprising:
one or more instructions that, when executed by a processor, cause the processor to:
provide a toolkit incorporating customized functionality on top of functionality of one or more applications for assisting users in performing an integration of businesses subject to a merger or acquisition there between,
the customized functionality including a security layer and program milestone tracking not available in the one or more applications,
define a plurality of cascading hierarchy levels for the security layer reflecting a level of access users are granted to a plurality of items stored in a respective library of the one or more applications,
link to a project server associated with the one or more applications,
manage the plurality of items by leveraging the functionality of the one or more applications based on linking to the project server,
import the plurality of items to the toolkit based on managing the plurality of items,
encode the plurality of items with hierarchical metadata based on the plurality of cascading hierarchy levels,
the hierarchical metadata including hierarchy values such that a requesting user is denied access to a requested item when a hierarchy value of the requested item is inconsistent with a level of access corresponding to the requesting user,
create and track program milestones based on the plurality of items, and
generate and filter reports by each level in the cascading hierarchy levels based on the plurality of items that are encoded and the program milestones.

16. The one or more non-transitory computer-readable media of claim 15, where the program milestones define necessary steps for completing the merger or acquisition.

17. The one or more non-transitory computer-readable media of claim 15, where the one or more instructions, when executed by the processor, further cause the processor to:
receive updates to the program milestones by importing a file from the project server.

18. The one or more non-transitory computer-readable media of claim 15, where the one or more instructions, when executed by the processor, further cause the processor to:
receive status information associated with tracking communications between users by at least one of volume, audience, or due date,
where the program milestones are tracked based on the status information.

19. The one or more non-transitory computer-readable media of claim 15, where the one or more instructions, that cause the processor to link to the project server, further cause the processor to:
directly link to the project server.

* * * * *